US012418969B2

(12) United States Patent
Choi et al.

(10) Patent No.: US 12,418,969 B2
(45) Date of Patent: Sep. 16, 2025

(54) METHOD AND SYSTEM FOR INTEGRATED CONTROLLING TO A PLURALITY OF LIGHTING DEVICES AND THE LIGHTING DEVICES

(71) Applicant: HYBE Co., Ltd., Seoul (KR)

(72) Inventors: Bo Yoon Choi, Seoul (KR); Sung Joo Jeong, Seoul (KR); Hyeong Gu Kim, Seoul (KR); Da Hye Seo, Seoul (KR)

(73) Assignee: HYBE CO., LTD, Seoul (KR)

( * ) Notice: Subject to any disclaimer, the term of this patent is extended or adjusted under 35 U.S.C. 154(b) by 154 days.

(21) Appl. No.: 18/343,406

(22) Filed: Jun. 28, 2023

(65) Prior Publication Data

US 2024/0008156 A1    Jan. 4, 2024

(30) Foreign Application Priority Data

Jul. 4, 2022  (KR) ........................ 10-2022-0081746

(51) Int. Cl.
*H05B 47/165*  (2020.01)
*H05B 47/155*  (2020.01)
*H05B 47/19*   (2020.01)

(52) U.S. Cl.
CPC ......... *H05B 47/165* (2020.01); *H05B 47/155* (2020.01); *H05B 47/19* (2020.01)

(58) Field of Classification Search
CPC .... H05B 47/165; H05B 47/155; H05B 47/19; H05B 47/197; H05B 47/1965; H05B 47/1985; H05B 47/105; H05B 47/18; G09G 2370/16; G06F 3/1423; A63J 5/02; F21W 2131/406
See application file for complete search history.

(56) References Cited

U.S. PATENT DOCUMENTS

| 2014/0184386 A1 | 7/2014 | Regler et al. |
| 2019/0037671 A1 | 1/2019 | Noh et al. |
| 2020/0029411 A1* | 1/2020 | Barna ................... H04W 76/15 |
| 2021/0076471 A1 | 3/2021 | Kwon et al. |
| 2021/0076472 A1 | 3/2021 | Kim et al. |

(Continued)

FOREIGN PATENT DOCUMENTS

| JP | 2014-529844 | 11/2014 |
| JP | 2015-11981  | 1/2015 |

(Continued)

*Primary Examiner* — Daniel D Chang
(74) *Attorney, Agent, or Firm* — KILE PARK REED & HOUTTEMAN PLLC

(57) ABSTRACT

A plurality of lighting devices and a method for integrated control of the plurality of lighting devices according to an embodiment of the present invention, as a method for integrated control of a plurality of lighting devices by a directing application executed by at least one processor of a director terminal, comprises transmitting a default control signal instructing execution, suspension, or termination of a light emission pattern based on a basic library stored in a lighting device to a plurality of lighting devices; and implementing integrated lighting control performance directing according to the transmitted default control signal, wherein the integrated lighting control performance operates each of the plurality of lighting devices collectively in a predetermined light emission pattern to produce a specific light emission pattern as a whole.

7 Claims, 8 Drawing Sheets

(56) References Cited

U.S. PATENT DOCUMENTS

2022/0264733 A1* 8/2022 Choi .................... H05B 47/155
2022/0386437 A1   12/2022 Kwon et al.
2022/0400545 A1   12/2022 Kim et al.

FOREIGN PATENT DOCUMENTS

| KR | 10-2019-0001458 | 1/2019 |
| KR | 10-2019-0013111 | 2/2019 |
| KR | 10-1970358      | 4/2019 |
| KR | 10-2019-0070220 | 6/2019 |
| KR | 10-2021-0043510 | 4/2021 |
| KR | 10-2022-0057502 | 5/2022 |

\* cited by examiner

METHOD AND SYSTEM FOR INTEGRATED CONTROLLING TO A PLURALITY OF LIGHTING DEVICES AND THE LIGHTING DEVICES

CROSS-REFERENCE TO RELATED APPLICATIONS

This Application claims priority under 35 U. S. C. 119(a) to Korean Patent Application No. 10-2022-0081746, filed on Jul. 4, 2022 in the Korean Intellectual Property Office, the entire disclosure of which is incorporated herein by reference in its entirety.

TECHNICAL FIELD

The present invention relates to a plurality of lighting devices and a method and system for integrated controlling of the same. More particularly, the present disclosure relates to a plurality of lighting devices capable of being collectively controlled regardless of an operating environment and a method and system for integrated controlling thereof.

BACKGROUND

A lighting device may refer to a device that emits light in various patterns by being carried by an individual or provided to an individual.

In most cases, users watching a performance or an exhibition in a place such as a theater, a concert hall, and/or an art museum where a large number of people are gathered may hold lighting devices, or lighting devices may be provided by attaching to each user's seat. The lighting devices may be used for a performance guide, an instruction for movement, or orchestrated cheering in the place above.

In particular, a lighting device provided to each individual may operate differently depending on a specific location or on a particular individual. Recently, a controlling method for remotely controlling the lighting devices to realize a specific shape or pattern as planned across a space is developed and used frequently in various fields.

However, when the operating environment is not properly established, for example various types of data required for controlling the performance in harmony is not stored in advance on the lighting device due to some factors (e.g., lack of preparation by the user or a system glitch, etc.), the prior art in the field (e.g., Korean Patent No. 10-1970358) encounters a problem that makes remote control of light emission from the corresponding lighting device difficult.

On the other hand, a lighting device may generally be controlled by different control protocols depending on main actors of the performance (e.g., a specific musician) or manufacturers of the lighting devices.

For example, the light emission operation of a first lighting device group used for the performance of a first musician and a second lighting device group used for the performance of a second musician may be controlled according to different control protocols.

However, as described above, the situation which requires a plurality of lighting devices complied with different control protocols to be controlled in harmony may be occurred to implement a unified expression.

For example, when a first musician and a second musician give a joint performance, namely, when a first lighting device group and a second lighting device group coexist, the first lighting device group and the second lighting device group may have to perform in an unified fashion for the joint performance although the respective groups use different control protocols.

However, the plurality of lighting device groups above requires separate control consoles to perform the control of each group of lighting device complied with different control protocol and may cause a problem that as many control consoles as the number of different control protocols are needed.

On top of that, for this reason, external factors such as various cue signs and LTC for controlling the plurality of control consoles simultaneously are additionally required, which cause the increase of the required cost and efforts. In addition, the increased cost and efforts will reduce the flexibility to add a new lighting device group and the likelihood of the unified directing of the concert, etc.

Accordingly, a need for developing and introducing a new technology to solve the problems above has been emerged.

SUMMARY

The present invention has been made to solve the problems described above and intends to provide a plurality of lighting devices capable of being collectively controlled regardless of an operating environment and a method and system for integrated controlling thereof.

Specifically, an object of the present invention is to provide a remote control of lighting devices which have not completed initial setting required for getting the lighting devices controlled remotely by using a universal event code and a method and system for integrated controlling thereof.

Another object of the present invention is to provide a collective and simultaneous control of a plurality of lighting device groups complying with different control protocols and a method and system for integrated controlling thereof.

Technical objects to be achieved by the present disclosure and embodiments of the invention are not limited to the technical objects described above, and other technical objects may also be addressed.

A plurality of lighting devices and an integrated control method for the same according to an embodiment of the present invention, as a method for integrated control of a plurality of lighting devices through a directing application executed on at least one processor of a director terminal, comprises transmitting a default control signal instructing execution, suspension, or termination of a light emission pattern based on a basic library stored in a lighting device to a plurality of lighting devices and implementing integrated lighting control performance according to the transmitted default control signal. And the integrated lighting control performance operates each of the plurality of lighting devices collectively in a predetermined light emission pattern to make the plurality of lighting devices produce a specific light emission pattern as a whole.

The basic library is stored in the firmware of the plurality of lighting devices by default and is operated based on the default control signal.

Also, the method further includes performing an initial setting for at least part of the plurality of lighting devices.

Also, the initial setting includes an event registration process that defines a control protocol for controlling the lighting device and a pairing process that stores performance preparation data into the lighting device.

Also, the performance preparation data includes at least one of a library for setting a specific emission pattern of the lighting device and a scenario for setting a specific emission pattern of the lighting device for a predetermined period.

Also, the method further includes transmitting a custom control signal instructing execution, suspension, or termination of a light emission pattern based on performance preparation data stored in the setting-type lighting device which has completed the initial setting to a plurality of setting-type lighting devices which require the initial setting and implementing integrated lighting control performance according to the transmitted custom control signal.

Also, the method further includes transmitting a combined control signal instructing execution, suspension, or termination of a light emission pattern based on the basic library stored in the lighting device and the performance preparation data stored in the setting-type lighting device and implementing integrated lighting control performance according to the transmitted combined control signal.

Also, the combined control signal includes the default control signal and the custom control signal.

Also, if the setting-type lighting device receives the combined control signal, the implementation of the integrated lighting control performance according to the combined control signal includes controlling light emission of the setting-type lighting device by firstly applying a custom control signal in the combined control signal.

Meanwhile, an integrated control method for a plurality of lighting devices according to an embodiment of the present invention, as a method for integrated control of a plurality of lighting devices by at least one processor module of a central server, comprises receiving a transmission request of a lighting device control signal for a plurality of lighting device groups complying with different control protocols from a director terminal, transmitting the lighting device control signal to the plurality of lighting device groups, and implementing integrated lighting control performance according to the transmitted lighting device control signal. And the lighting device control signal instructs execution, suspension, or termination of a light emission pattern based on at least one of a library or a scenario stored in at least one lighting device within corresponding lighting device group.

The transmitting the lighting device control signal to the plurality of lighting device groups includes transmitting an integrated protocol control signal instructing execution, suspension, or termination of a light emission pattern based on integrated control data stored in the lighting device, and the integrated protocol control signal is a lighting device control signal transmitted and received based on an integrated protocol, which is a third control protocol that provides a unified control protocol for the plurality of lighting device groups.

Also, the integrated protocol control signal includes at least one of a default integrated control signal instructing execution, suspension, or termination of a light emission pattern based on an integrated basic library stored in the lighting device and a custom integrated control signal instructing execution, suspension, or termination of a light emission pattern based on integrated performance preparation data stored in the lighting device.

Also, the transmission of the lighting device control signal to the plurality of lighting device groups includes obtaining a conversion control signal that has detected a control signal corresponding to the lighting device control signal for each of the different control protocols.

Also, the transmission of the lighting device control signal to the plurality of lighting device groups further includes transmitting the conversion control signal detected for each of the different control protocols to the plurality of lighting device groups through each control protocol matching the conversion control signal.

On the other hand, an integrated control system for a plurality of lighting devices according to an embodiment of the present invention comprises at least one memory in which an integrated lighting control application is stored, and at least one processor reading out the integrated lighting control application stored in the memory and executing an integrated control method for a plurality of lighting devices. The instructions of the integrated lighting control application comprise at least one of an instruction to transmit a default control signal, an instruction of execution, suspension, or termination of a light emission pattern based on a basic library stored in a lighting device, an instruction to implement integrated lighting control performance according to the transmitted default control signal, an instruction to transmit a custom control signal instructing execution, suspension, or termination of a light emission pattern based on performance preparation data stored in a setting-type lighting device, an instruction to implement integrated lighting control performance according to the transmitted custom control signal, and an instruction to transmit a combined control signal instructing execution, suspension, or termination of a light emission pattern based on a basic library stored in the lighting device and the performance preparation data stored in the setting-type lighting device to a plurality of lighting devices and implementing integrated lighting control performance according to the transmitted combined control signal.

The instructions of the integrated lighting control application further comprise at least one of an instruction to transmit an integrated protocol control signal transmitted and received based on an integrated protocol, which provides a unified control protocol for a plurality of lighting device groups complying with different control protocols, to the plurality of lighting device groups and to implement integrated lighting control performance according to the transmitted integrated protocol control signal and an instruction to transmit a conversion control signal for each of the different control protocols detected based on a target control signal to the plurality of lighting device groups and to implement integrated lighting control performance according to the transmitted conversion control signal.

On the other hand, a lighting device according to an embodiment of the present invention comprises at least one storage unit for storing a basic library, at least one communication unit, at least one light source unit, and at least one processor. The processor receives performance preparation data through the communication unit, stores the received performance preparation data on the storage unit, receives a lighting device control signal through the communication unit, reads out at least one of a library or a scenario corresponding to the received lighting device control signal from the basic library or the performance preparation data stored on the storage unit, and executes a light emission operation according to at least one of the read-out library and scenario by controlling the light source unit.

The processor receives a lighting device control signal including at least one of a custom control signal, a default control signal, a combined control signal, an integrated protocol control signal, and a conversion control signal through the communication unit.

A plurality of lighting devices and an integrated control method and system thereof according to an embodiment of the present invention support collective control of all lighting devices regardless of the operating environment, thereby easily implementing simultaneous control of all the related lighting devices without performing separate processing for each lighting device having a different operating environment and without exerting additional efforts to perform the control of the lighting devices in harmony may be achieved.

Also, even when the operating environment is poorly established and thus, various types of data required for remote control are not stored in advance on at least part of lighting devices due to some factors (e.g., lack of preparation by the user and/or a system glitch, etc.), a plurality of lighting devices and an integrated control method and system thereof according to an embodiment of the present invention provide remote control of the lighting devices which has not completed initial settings required for getting the plurality of lighting devices controlled remotely by using a universal event code, thereby performing unified remote control of all of the lighting devices including the corresponding lighting devices and enabling all of the lighting devices to participate in planned performance accordingly may be achieved.

Also, a plurality of lighting devices and an integrated control method and system thereof according to an embodiment of the present invention provide collective and simultaneous control of a plurality of lighting device groups controlled by different control protocols, thereby easily and accurately implementation of unified performance directing based on light-emitting operations of the plurality of lighting device groups by using only one control console even when a plurality of lighting device groups conforming to different control protocols coexist, considerable reduction of the cost or efforts required to deal with the situation, enabling a new lighting device group based on another control protocol to be added easily and flexibly to the corresponding performance directing and allowing the new lighting device group to participate therein may be achieved.

The technical effects of the present disclosure are not limited to the technical effects described above, and other technical effects not mentioned herein may be understood clearly from the description below.

DESCRIPTION OF EMBODIMENTS

Figure 1:
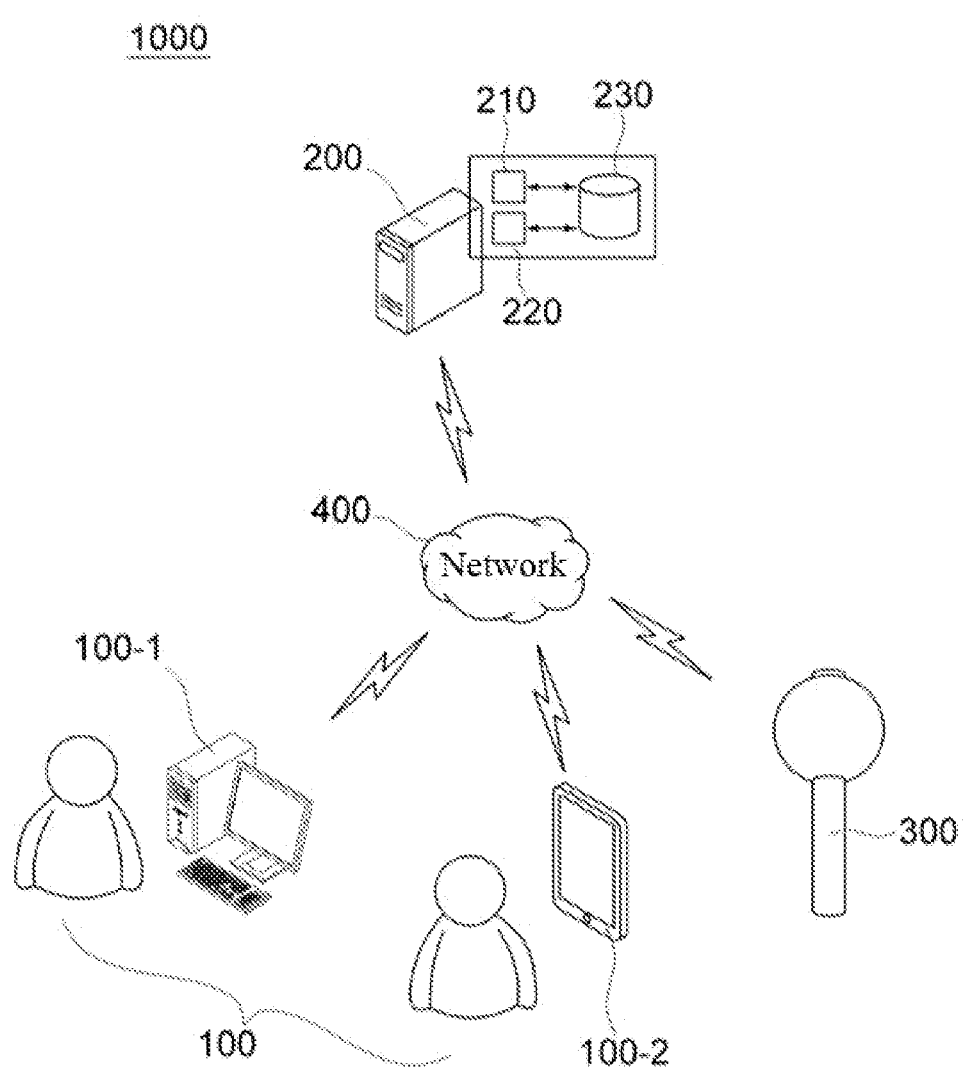
FIG. 1 is a conceptual drawing of an integrated control system for a plurality of lighting devices according to an embodiment of the present invention.

Even though the present invention allows various changes and numerous modifications, particular embodiments will be described and illustrated in detail below. But this is only for the purpose of the explanation of the embodiments of the present invention but not for the purpose of limiting or abandoning the possible modifications which a person having ordinary skill in the art may conceive. Effects and features of the present invention, and a method for achieving them will become apparent with reference to the embodiments described below in detail in conjunction with the drawings. In the following embodiments, terms such as first, second, etc. are used for the purpose of distinguishing one component from the other, not in a limiting sense. Also, a singular expression includes a plural expression unless the context clearly dictates otherwise. In addition, terms such as "including" or "having" means that the features or components described in the specification are present, and do not preclude the possibility that one or more other features or components will be added. In addition, in the drawings, the size of the components may be exaggerated or reduced for convenience of description. For example, the size and thickness of each component shown in the drawings are arbitrarily indicated for convenience of description, so the present disclosure is not limited thereto.

Hereinafter, embodiments of the present invention will be described in detail with reference to the accompanying drawings, and when described with reference to the drawings, the same or corresponding components are given the same reference numerals, and repeated descriptions thereof will be omitted.

FIG. 1 is a conceptual drawing of an integrated control system for a plurality of lighting devices according to an embodiment of the present invention.

Referring to FIG. 1, an integrated control system for a plurality of lighting devices 1000 (hereinafter, an integrated lighting control system) according to an embodiment of the present invention may provide a plurality of lighting device integrated control services (hereinafter, an integrated lighting control service) being capable of collectively controlling all lighting devices regardless of the operating environment corresponding to each of the plurality of lighting devices. The integrated lighting control system 1000 providing the integrated lighting control service may comprise a terminal 100, a central server 200, a lighting device 300, and a network 400.

The terminal 100, the central server 200, and the lighting device 300 may be connected with each other through the network 400.

The network 400 in FIG. 1 may be a connection structure in which information may be exchanged among the respective nodes, such as the terminal 100, the central server 200, and/or the lighting device 300. Examples of the network 400 include 3rd Generation Partnership Project (3GPP) network, Long Term Evolution (LTE) network, World Interoperability for Microwave Access (WiMAX) network, Internet, Local Area Network (LAN), Wireless Local Area Network (LAN), Wide Area Network (WAN), Personal Area Network (PAN), Bluetooth network, satellite broadcasting network, an analog broadcasting network, and Digital Multimedia Broadcasting (DMB) network but are not limited thereto.

Meanwhile, meaning of the terms being used in the following embodiments will be first described for the purpose of more effective description of the integrated lighting control service according to an embodiment of the present invention.

In an embodiment of the present invention, the library is preset data to make the lighting device 300 operate in a specific light emission pattern (i.e., a specific light emission shape) and may include library identification information and light emission pattern information.

The library according to the embodiment may include identification information specifying the corresponding library (e.g., an identification number and/or a library name) and light emission pattern information that provides a specific light emission pattern preset by the library.

Here, the light emission pattern information according to the embodiment may include parameters related to whether to emit light from the lighting device 300, color, brightness, and/or dynamic effects, and the lighting device 300 may be operated according to the set value of each parameter (hereinafter, a light emission set value).

The dynamic effect according to the embodiment may be the data that implements a predetermined effect by dynamically changing the set values of other parameters (e.g., information as to whether to emit light, color, and/or brightness) in the light emission pattern information.

For example, the dynamic effect may include a blinking effect that turns on and off a lighting device quickly by setting whether to emit light from the lighting device 300 differently for each period within a predetermined time, a gradation effect that gradually changes light emission color by setting the color differently for each period, and a fade in/out effect that makes a lighting device gradually darken or brighten by setting the light emission brightness differently for each period.

In an embodiment, at least one such library may be created, stored, and managed.

For example, the library may be implemented using a plurality of libraries, such as a first library in which library identification information and light emission pattern information (light emission pattern set value) are set as "identification number 0001/light emission on/first color/first brightness/first dynamic effect" and a second library in which library identification information and light emission pattern information (light emission pattern set value) are set as "identification number 0002/light emission on/second color/second brightness/second dynamic effect."

The library according to the embodiment may be generated to include a library for each seat.

Here, the library for each seat according to the embodiment may have the same library identification information corresponding to each seat where the lighting device 300 is to be placed in a predetermined space (e.g., a performance hall) but have different light emission pattern information according to the corresponding library.

In other words, the library may be generated to include a library for each seat that controls the lighting device 300 to operate with a different light emission pattern depending on the position of the seat on which the lighting device 300 is disposed.

For example, the first library may be generated to include a library for each seat, which has the first library-first seat-first emission pattern information and the first library-second seat-second emission pattern information.

Therefore, the embodiment of the present invention may implement, based on the library for each seat, integrated lighting control performance in which the lighting device 300 disposed on each seat collectively operates with a light emission pattern specific to the lighting device to produce a specific shape as a whole.

Meanwhile, in an embodiment of the present invention, a scenario is the preset data to operate the lighting device 300 in a specific emission pattern for a predetermined period and may include scenario identification information and light emission pattern information.

Specifically, the scenario according to the embodiment may include identification information (e.g., an identification number and/or a scenario name) specifying the corresponding scenario and light emission pattern information (hereinafter, scenario pattern information) providing a specific light emission pattern preset for the corresponding scenario.

The scenario according to the embodiment may be generated to include a scenario for each seat.

The scenario for each seat according to the embodiment may have the same scenario identification information corresponding to each seat where the lighting device 300 is to be placed in a predetermined space (e.g., a performance hall) but have different scenario pattern information according to the corresponding scenario.

In other words, the scenario may be generated to include a scenario for each seat that controls the lighting device 300 to operate with a different light emission pattern depending on the position of the seat on which the lighting device 300 is disposed.

For example, the first scenario may be generated to include a scenario for each seat, which has the first scenario-first seat-first scenario pattern information and the first library-second seat-second scenario pattern information.

Thus, the embodiment of the present invention may implement, based on the scenario for each seat, integrated lighting control performance in which the lighting device 300 disposed on each seat collectively operates with a light emission pattern specific to the lighting device to produce a specific shape as a whole.

Also, the performance preparation data according to the embodiment of the present invention may mean the data that defines various light emission patterns in advance for each seat where the lighting device 300 is disposed for the integrated lighting control performance and may mean the data that have to be stored in advance in the lighting device 300 before a performance is started.

In the embodiment, the performance preparation data may be generated to include at least one of the libraries and/or the scenario described above.

Also, the integrated lighting control performance according to the embodiment may mean a method of directing a performance of a plurality of lighting devices 300 to be operated collectively with a predetermined light emission pattern to produce a specific shape as a whole.

Also, the lighting device control signal according to the embodiment may mean a control signal that controls the light emission operation of the lighting device 300 based on the data (e.g., the basic library and/or performance preparation data) stored in the lighting device 300.

Hereinafter, the terminal 100, the central server 200, and the lighting device 300 implementing the integrated lighting control system 1000 will be described in detail with reference to the accompanying drawings.

Terminal 100

The terminal 100 according to an embodiment of the present invention may be a predetermined computing device where a lighting control application (hereinafter, an application) that provides an integrated lighting control service is installed on.

The application according to the embodiment may be divided into a directing application and a cheering application.

The directing application and the cheering application may be a single application but perform different functional operations depending on a user.

In other words, the directing application and the cheering application may be a single application but grant different rights and provide different functional operations according to the user's account (e.g., whether the user of the application is a director or a user).

Returning to the description, the terminal 100 having the application above may include a director terminal 100-1 used by the director who plans performance, and a light stick terminal 100-2 used by the user who watches the performance and uses the lighting device 300.

According to the embodiment, the directing application may be installed on the director terminal 100-1, and the cheering application may be installed on the light stick terminal 100-2.

The director terminal 100-1 and the light stick terminal 100-2 are distinguished to identify the users of each terminal, but their components or functional operations may be the same.

However, according to the embodiment, the light stick terminal 100-2 may perform various functional operations for an integrated lighting control service by being matched 1-to-1 to a predetermined lighting device 300 and operating in conjunction with the device.

Specifically, the light stick terminal 100-2 according to the embodiment may be mapped 1-to-1 to the lighting device 300 and operate by being paired with the device based on a terminal 100 identification code specifying each light stick terminal 100-2 and a device identification code specifying each lighting device 300.

Returning to the description, from a hardware point of view, the terminal 100 may include a mobile-type computing device and/or a desktop-type computing device in which an application is installed.

The mobile-type computing device may be a mobile device such as a smartphone or a tablet PC in which an application is installed.

For example, the mobile-type computing device may include a smartphone, a mobile phone, a device for digital broadcasting, a personal digital assistant (PDA), a portable multimedia player (PMP), and a tablet PC.

And, the desktop-type computing device may include a device in which a program for executing an integrated lighting control service based on wired/wireless communication, such as a personal computer including a fixed desktop PC, a laptop, and an ultrabook in which an application is installed.

Also, according to the embodiment, the terminal 100 may further include a predetermined server computing device that provides an integrated lighting control service environment.

Figure 2:
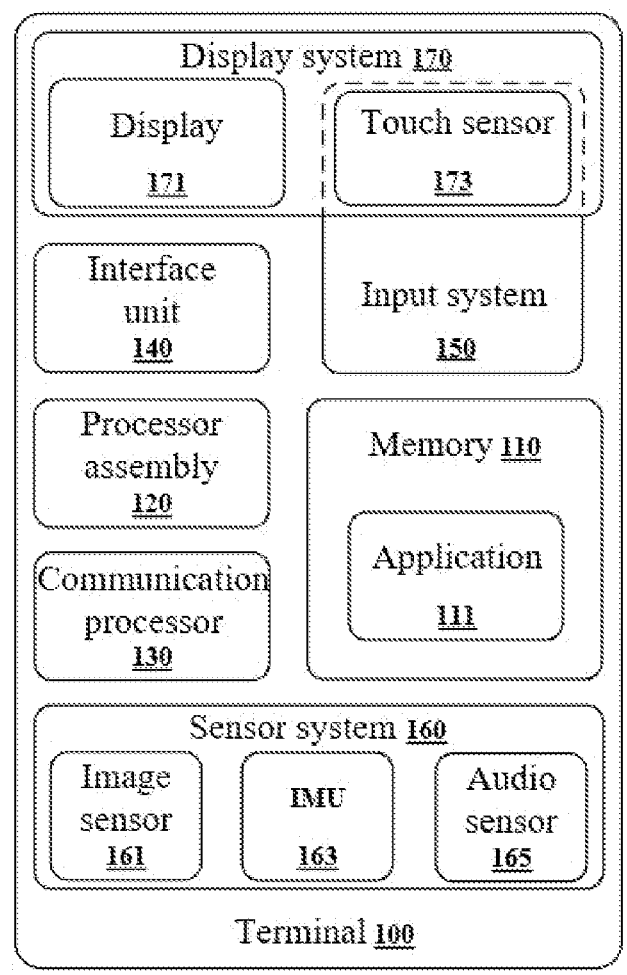
FIG. 2 is an internal block diagram of a terminal according to an embodiment of the present invention.

FIG. 2 is an internal block diagram of a terminal 100 according to an embodiment of the present invention.

Referring to FIG. 2, from a functional point of view, the terminal 100 may comprise a memory 110, a processor assembly 120, a communication processor 130, an interface unit 140, an input system 150, a sensor system 160, and a display system 170. Theses elements may be included within a housing of the terminal 100.

Specifically, the memory 110 stores an application 111, and the application 111 may store one or more of various application programs, data, and instructions for providing an integrated lighting control service environment.

In other words, the memory 110 may store instructions and data that may be used to create an integrated lighting control service environment.

Also, the memory 110 may include a program area and a data area.

The program area according to the embodiment may be linked between an operating system (OS) for booting the terminal 100 and functional elements, and the data area may store the data generated as the terminal 100 is used.

Also, the memory 110 may include at least one or more non-volatile computer-readable storage media and volatile computer-readable storage media.

For example, the memory 110 may be implemented using various storage devices such as a ROM, an EPROM, a flash drive, and a hard drive. In addition, the memory 110 may also be implemented using web storage performing a storage function of the memory 110 on the Internet.

The processor assembly 120 may include at least one or more processors capable of executing instructions of the application 111 stored in the memory 110 to perform various tasks for creating an integrated lighting control service environment.

According to the embodiment, the processor assembly 120 may control the overall operation of the elements in the terminal 100 through the application 111 stored in the memory 110 to provide an integrated lighting control service.

The processor assembly 120 may be a system-on-a-chip (SOC) suitable for the terminal 100, including a central processing unit (CPU) and/or a graphics processing unit (GPU), which may execute an operating system (OS) and/or an application program stored in the memory 110 and control each constituting element mounted in the terminal 100.

Also, the processor assembly 120 may communicate with each element in the terminal 100 internally by a system bus and may include one or more predetermined bus structures including a local bus.

Also, the processor assembly 120 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electric units for performing functions.

The communication processor 130 may include one or more devices for communicating with an external device. The communication processor 130 may communicate through a wireless network.

Specifically, the communication processor 130 may communicate with the terminal 100 that stores a contents source for implementing an integrated lighting control service environment and communicate with various user input components such as a controller that receives user inputs.

In the embodiment, the communication processor 130 may transmit and receive various data related to an integrated lighting control service to and from another terminal 100, an external server, and/or a device.

The communication processor 130 may transmit and receive data wirelessly to and from at least one of a base station, an external terminal 100, and an arbitrary server on a constructed mobile communication network through a communication device capable of performing technical standards or communication methods for mobile communication (e.g., Long Term Evolution (LTE), Long Term Evolution-Advanced (LTE-A), 5G New Radio (NR), and WiFi) or a short-distance communication method.

The sensor system 160 may include various sensors such as an image sensor 161, an inertial measurement unit (IMU) 163, an audio sensor 165, a distance sensor, a proximity sensor, and a contact sensor.

The image sensor 161 may capture an image and/or a video of the physical space around the terminal 100.

In the embodiment, the image sensor 161 may obtain an image (e.g., a planned performance direction image) related to an integrated lighting control service.

Also, the image sensor 161 may be disposed on the front or/and rear surface of the terminal 100 to obtain an image by photographing the scene and may capture the physical space through a camera disposed toward the outside of the terminal 100.

The image sensor 161 may include an image sensor device and an image processing module. Specifically, the image sensor 161 may process a still image or a moving image obtained by an image sensor device (e.g., CMOS or CCD).

Also, the image sensor 161 may process a still image or a moving image obtained through the image sensor device using an image processing module to extract necessary information and transmit the extracted information to the processor.

The image sensor 161 may be a camera assembly including at least one or more cameras.

The camera assembly may include a general camera for photographing a scene in a visible light band and may further include a special camera such as an infrared camera or a stereo camera.

Also, the image sensor 161 as described above may be included in the terminal 100 and operated according to an embodiment and may be included in an external device (e.g., an external server and/or apparatus) and operated through interworking based on the communication processor 130 and/or the interface unit 140.

The inertial measurement unit (IMU) 163 may detect at least one or more of motion and acceleration of the terminal 100. For example, the IMUT 163 may be implemented as a combination of various position sensors such as an accelerometer, a gyroscope, and a magnetometer.

Also, the IMU 163, in conjunction with the position communication processor 130 such as the GPS of the communication processor 130, may recognize the spatial information about the physical space around the terminal 100.

The audio sensor 165 may recognize a sound in the surroundings of the terminal 100.

Specifically, the audio sensor 165 may include a microphone capable of detecting a voice input of a user that uses the terminal 100.

In the embodiment, the audio sensor 165 may receive voice data required for an integrated lighting control service from the user.

The interface unit 140 may connect the terminal 100 communicatively with one or more other devices.

Specifically, the interface unit 140 may include a wired and/or wireless communication device compatible with one or more different communication protocols.

Through the interface unit 140, the terminal 100 may be connected to various input/output devices.

For example, the interface unit 140 may be connected to an audio output device such as a headset port or a speaker to output audio.

For example, although the description exemplifies that the audio output device is connected through the interface unit 140, an embodiment in which the audio output device is installed inside the terminal 100 is also possible.

Also, for example, the interface unit 140 may be connected to an input device such as a keyboard and/or a mouse to obtain user input.

Although the description exemplifies that the keyboard and/or the mouse is connected through the interface unit 140, an embodiment in which the keyboard and/or the mouse is installed inside the terminal 100 is also possible.

This interface unit 140 may be implemented by using at least one of a wired/wireless headset port, an external charging port, a wired/wireless data port, a memory card port, a device connecting to a device equipped with an identification module, an audio Input/Output (I/O) port, a video Input/Output (I/O) port, an earphone port, a power amplifier, an RF circuit, a transceiver, and other communication circuits.

The input system 150 may detect a user's input (e.g., a gesture, a voice command, actuation of a button, or other types of inputs) related to an integrated lighting control service.

Specifically, the input system 150 may include a predetermined button, a touch sensor, and/or an image sensor 161 for receiving user's motion input.

Also, the input system 150 may be connected to an external controller through the interface unit 140 to receive a user's input.

The display system 170 may output various information related to an integrated lighting control service as a graphic image.

In an embodiment, the display system 170 may display various user interfaces including a library creation interface and/or a scenario creation interface.

The display system 170 may be implemented using at least one of a liquid crystal display (LCD), a thin film transistor-liquid crystal display (TFT LCD), an organic light-emitting diode (OLED), a flexible display, a three-dimensional (3D) display, and an electronic ink (e-ink) display.

The elements described above may be disposed in the housing of the terminal 100, and the user interface may include a touch sensor 173 on a display 171 configured to receive a user's touch input.

Specifically, the display system 170 may include a display 171 that outputs an image and a touch sensor 173 that detects a user's touch input.

For example, the display 171 may serve as a touch screen by forming a layer structure with the touch sensor 173 or by being formed integrally with the touch sensor 173.

The touch screen may function as a user input unit that provides an input interface between the terminal 100 and the user and may provide an output interface between the terminal 100 and the user.

Also, according to an embodiment, the terminal 100 may further perform at least part of the functional operations performed by the central server 200 and/or the lighting device 300 to be described later.

Central Server 200

On the other hand, the central server 200 according to an embodiment of the present invention may perform a series of processes for providing an integrated lighting control service. Specifically, in the embodiment, the central server 200 may provide the integrated lighting control service by exchanging data required for operating a lighting device control process in an external device such as the terminal 100 and/or the lighting device 300 with the external device.

In an embodiment, the central server 200 may provide an environment in which the application 111 may operate in an external device (e.g., a mobile-type computing device and/or a desktop-type computing device).

To this end, the central server 200 may include an application program, data, and/or commands for the application 111 to operate and may transmit and receive resulting data to and from the external device.

Also, in an embodiment, the central server 200 may provide a signal capable of implementing a predetermined light emission operation in an external device (e.g., the lighting apparatus 300).

To this end, the central server 200 may include an application program, data, and/or commands for implementing the light emission operation and may transmit and receive the resulting data with the external device.

Also, in the embodiment, the central server 200 may create a library described above.

Also, in the embodiment, the central server 200 may generate a scenario described above.

Also, in the embodiment, the central server 200 may generate the performance preparation data described above.

Also, in the embodiment, the central server 200 may distribute the generated performance preparation data.

Specifically, the central server 200 in the embodiment may distribute the performance preparation data over a plurality of lighting devices 300 in conjunction with the terminal 100 (e.g., the director terminal 100-1 and/or the light stick terminal 100-2).

More specifically, in the embodiment, the central server 200 may receive a request from the director terminal 100-1 to distribute the performance preparation data over a plurality of lighting devices 300.

Also, in the embodiment, the central server 200 may transmit the performance preparation data requested for distribution to a plurality of light stick terminals 100-2.

And each of the plurality of light stick terminals 100-2 may be matched and linked 1-to-1 to each of a plurality of lighting devices 300.

In an embodiment, each of the plurality of light stick terminals 100-2 may be mapped 1-to-1 to each of a plurality of lighting devices 300 and operate by being paired with the device based on a terminal 100 identification code specifying each light stick terminal 100-2 and a device identification code specifying each of the plurality of lighting devices 300.

Thus, the plurality of light stick terminals 100-2 may provide the performance preparation data received from the central server 200 to the lighting device 300 matched to each light stick terminal 100-2.

And the plurality of light stick terminals 100-2 may provide the performance preparation data to the lighting device 300 matched to each light stick terminal 100-2 based on a Bluetooth pairing method, for example.

Accordingly, the plurality of lighting devices 300 may receive, store, and manage the performance preparation data corresponding to the seats where the respective lighting devices 300 are to be disposed.

Thus, in the embodiment, the central server 200 may distribute the performance preparation data over a plurality of lighting devices 300.

Figure 3:
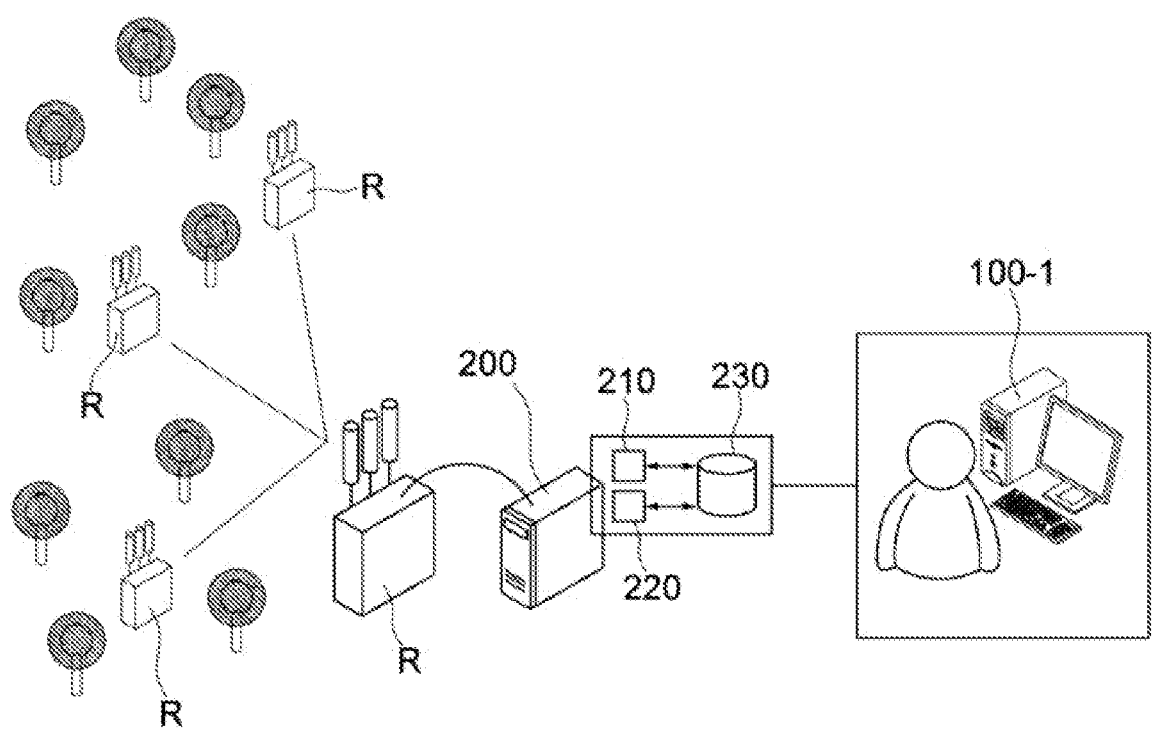
FIG. 3 is one example illustrating a method for transmitting a lighting device control signal based on a broadcasting scheme from a central server according to an embodiment of the present invention.

FIG. 3 is one example illustrating a method for transmitting a lighting device control signal based on a broadcasting scheme from a central server 200 according to an embodiment of the present invention.

Also, referring to FIG. 3, the central server 200 transmits the lighting device control signal to a plurality of lighting devices 300 to implement integrated lighting control performance.

Specifically, the central server 200, from the director terminal 100-1, may receive a request to distribute the lighting device control signal (e.g., a custom control signal, a default control signal, a combined control signal, an integrated protocol control signal, and/or a conversion control signal) to a plurality of lighting devices 300.

Also, the central server 200 may transmit the lighting device control signal requested for distribution to a plurality of lighting devices 300.

And the central server 200 may operate in conjunction with at least one repeater R to smoothly transmit the lighting device control signal to the plurality of lighting devices 300.

Here, each of the at least one repeater R according to the embodiment may transmit a predetermined data packet (e.g., a lighting device control signal) to the lighting devices 300 adjacent to the repeater based on a broadcasting method.

It should be noted that the broadcasting method may be a one-to-many communication scheme in which a predetermined data packet is transmitted over the entire network that the host of the network (e.g., the central server 200) oversees without separate designation of a recipient.

In general, when a unicast method is employed rather than a broadcasting method, the central server 200 has to transmit a data packet to be transmitted (e.g., a control signal) to a plurality of receivers (e.g., a plurality of lighting devices 300) many times, which may lead to reduce network efficiency due to redundant transmission of the same packet. Also, when a unicast method is employed instead of a broadcasting method, the central server 200 has to receive the ack message in response to the reception of a transmitted data packet (e.g., a control signal) respectively from a plurality of receivers (e.g., lighting devices 300), which may prevent data communication from being performed smoothly due to deterioration of communication conditions.

Therefore, the central server 200 according to an embodiment of the present invention may transmit the lighting device control signal to the plurality of lighting devices 300 in conjunction with the at least one repeater R using a broadcasting scheme based on a one-to-many communication method in which a data packet (e.g., the lighting device control signal) is transmitted without separate designation of a recipient over the entire network to which the central server belongs.

In other words, in the embodiment, the central server 200 transmits the lighting device control signal to a plurality of lighting devices 300 based on the broadcasting method, which accordingly minimizes communication loss of a control signal and, at the same time, a communication synchronization error among a plurality of lighting devices 300, thereby improves the communication efficiency.

Returning to the embodiment, the at least one repeater R that performs data transmission based on the broadcasting method may be directly included in the central server 200 or implemented as a device separate from the central server 200 to perform the functional operation as described above.

Hereinafter, descriptions are given on the assumption that the at least one repeater R is implemented by being included in the central server 200, but the present invention is not limited to the specific embodiment below.

Subsequently, a plurality of lighting devices 300 receiving the lighting device control signal from the central server 200 may perform light emission control according to the received lighting device control signal.

Specifically, the plurality of lighting devices 300 may perform light emission control according to the lighting device control signal by controlling the light source unit of each lighting device 300 according to a light emission pattern based on the received lighting device control signal.

Accordingly, the central server 200 according to an embodiment of the present invention may implement integrated lighting control performance based on a small-sized, fast lighting device control signal.

On the other hand, in the embodiment, the central server 200 may store and manage various application programs, commands, and/or data for implementing an integrated lighting control service.

In the embodiment, the central server 200 may store and manage at least one or more libraries, basic libraries, integrated basic libraries, scenarios, performance preparation data, integrated performance preparation data, lighting device control signals, and/or various user interfaces.

On the other hand, referring further to FIG. 1, the central server 200 according to the embodiment may be implemented as a predetermined computing device that includes at least one or more processor modules 210 for data processing, at least one or more communication modules 220 for exchanging data with an external device, various application programs for providing an integrated lighting control service, and/or at least one or more databases storing commands.

In FIG. 3, the database module 230 may store one or more of an operating system (OS), various application programs, data, and commands for providing an integrated lighting control service.

Also, the database module 230 may include a program and data areas.

The program area according to the embodiment may be linked between an operating system (OS) for booting a server and functional elements, and the data area may store the data generated as the server is used.

The database module 230 may be implemented using various storage devices such as a ROM, a RAM, an EPROM, a flash drive, and a hard drive. And the database module 230 may also be implemented using web storage performing a storage function of the database module 230 on the Internet.

Also, the database module 230 may be a recording medium in a attachable and/or detachable form to/from the server.

Meanwhile, the processor module 210 may control the overall operation of each unit described above to implement an integrated lighting control service.

The processor module 120 may be a system-on-a-chip (SOC) suitable for a server, including a central processing unit (CPU) and/or a graphics processing unit (GPU), which may execute an operating system (OS) and/or an application 111 program stored in the database module 230 and control each of the elements mounted in the server.

Also, the processor module 210 may communicate with each element internally by a system bus and may include one or more predetermined bus structures including a local bus.

Also, the processor module 210 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and other electric units for performing functions.

In the description of the embodiment above, it is assumed that the central server 200 performs the functional operations as described above. According to an embodiment, an external device (for example, the terminal 100 and/or the lighting device 300) may perform at least part of the functional operations performed by the central server 200. And the central server 200 may further perform at least part of the functional operations performed by the external device.

Lighting Device 300

A lighting device 300 according to an embodiment of the present invention may perform a light emission operation according to the control of an integrated lighting control system 1000.

Here, the lighting device 300 according to an embodiment of the present invention may refer to a device that emits light in various patterns by being carried by an individual or provided to an individual. Users watching a performance in a predetermined place such as a theater may carry the lighting device 300, or the lighting device 300 may be provided by attaching to each user's seat.

Specifically, in the embodiment, the lighting device 300 may store and manage various data (e.g., a basic library, performance preparation data, an integrated basic library, and/or integrated performance preparation data) required for integrated lighting control performance.

Also, the lighting device 300 may receive the lighting device control signal.

Also, the lighting device 300 may perform a light emission operation according to the received lighting device control signal and the various data stored.

Figure 4:
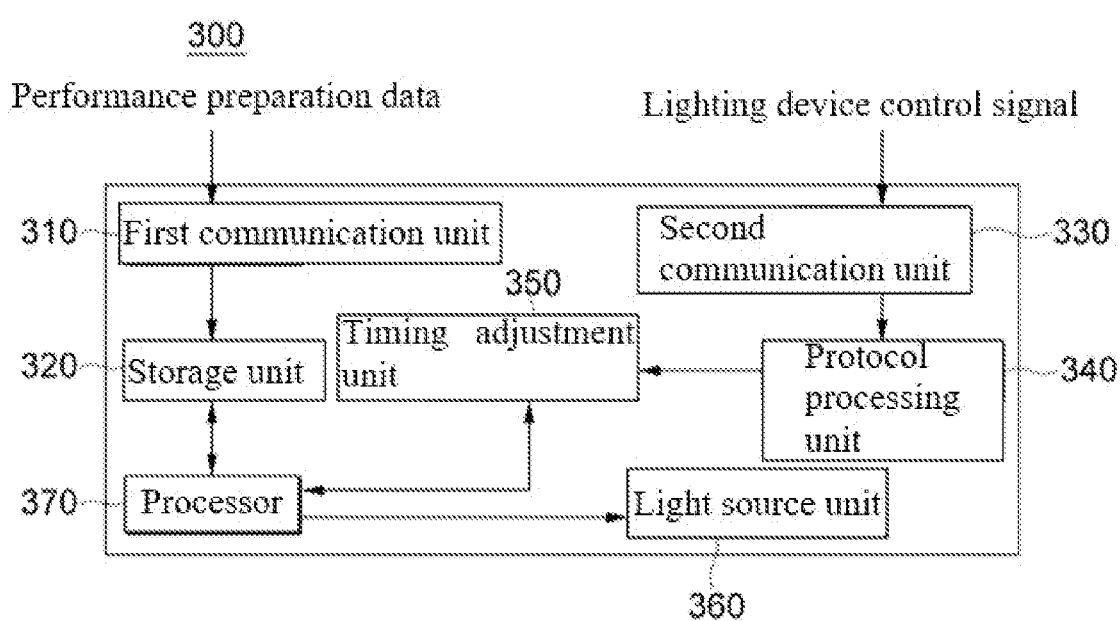
FIG. 4 is an internal block diagram of a lighting device according to an embodiment of the present invention.

FIG. 4 is an internal block diagram of a lighting device 300 according to an embodiment of the present invention.

Referring to FIG. 4, the lighting device 300 according to the embodiment may comprise a first communication unit 310, a storage unit 320, a second communication unit 330, a protocol processing unit 340, a timing adjustment unit 350, a light source unit 360, and a processor 370.

Specifically, in the embodiment, the first communication unit 310 may receive performance preparation data and/or integrated performance preparation data from a terminal 100.

The first communication unit 310 may include a wireless communication module complying with BLE or the IEEE 802.15.4 protocol. However, the present disclosure is not limited to the specific embodiment, and the first communication unit 310 may receive the performance preparation data and/or integrated performance preparation data through a wire communication.

The lighting device 300 according to the embodiment of the present invention may receive and store performance preparation data and/or integrated performance preparation data in advance at a place other than a theater (e.g., home) or may receive and store the data at the theater.

Also, the storage unit 320 may store and manage various data (e.g., a basic library, performance preparation data, an integrated basic library, and/or integrated performance preparation data) required for an integrated lighting control service.

Also, the second communication unit 330 may receive the lighting device control signal from a central server 200 (and/or a repeater R).

The second communication unit 330 may transmit and receive data to and from the central server 200 (and/or the repeater R) using Radio Frequency (RF) communication based on Bluetooth, Bluetooth Low Energy (BLE), WiFi, ZigBee, or UWB.

Also, the protocol processing unit 340 may determine the type of information received by the first communication unit 310 and/or the second communication unit 330.

When the received information is a control message (i.e., a lighting device control signal), a retransmission packet, or a sync packet, the protocol processing unit 340 may transmit the received information to the timing adjustment unit 350.

Subsequently, the timing adjustment unit 350 may adjust the operation timing of the lighting device 300 based on the sequence of each control message included in the received control message, the retransmission packet, or the sync packet.

Although FIG. 4 describes the timing adjustment unit 350 as a separate element, this is only an example, and the timing adjustment unit 350 may also be included in the configuration of the processor 370 depending on the embodiments.

Also, the light source unit 360 may perform a light emission operation such as emitting light of specific color, flickering, or adjusting brightness according to the information stored in the storage unit 320 and the control of the processor 370.

The light source unit 360 may be formed of LEDs. The light source unit 360 may be implemented in any form made up of specific light emitting materials and capable of performing a predetermined light emission operation.

Also, the processor 370 may control the overall operation of the lighting device 300.

In the embodiment, the processor 370 may control the light emission operation of the light source unit 360 according to a lighting device control signal which can be various data stored in the storage unit 320 (e.g., a basic library, performance preparation data, an integrated basic library, and/or integrated performance preparation data) and can be received from the second communication unit 330.

The processor 370 may determine whether to execute which library and/or scenario in the various data based on the received lighting device control signal.

In other words, the processor 370 may determine which library and/or scenario to be executed from predetermined libraries and/or scenarios by parsing the received lighting device control signal.

Also, the processor 370 may control the light source unit 360 to perform a light emission operation according to the determined library and/or scenario.

Based on the library and/or scenario identification information included in the lighting device control signal, the processor 370 may read out a light emission pattern corresponding to the identification information from the storage unit 320 and control the light source unit 360 to output the read-out light emission pattern.

Meanwhile, according to the embodiment, the lighting device 300 may further perform at least part of the functional operations performed by the terminal 100 and/or the central server 200.

And the lighting device 300 may further include the sensor system 160 and may further perform various functional operations based on the sensor system 160.

Integrated Control Method for a Plurality of Lighting Devices Based on Basic Library An embodiment of the present invention discloses a method for supporting light emission control of a lighting device 300 even if event registration or pairing with the corresponding lighting device 300 is incomplete due to some factors (e.g., lack of preparation by the user or a system glitch).

To this end, each of a plurality of lighting devices 300 according to an embodiment of the present invention may pre-store at least one basic library in the firmware.

Here, the basic library according to an embodiment of the present invention may mean a default library stored by default on the storage unit 320 of a lighting device 300 and operated by an external control signal (e.g., a lighting device control signal including a universal event code) without involving separate event registration with the lighting device 300 or pairing with a predetermined terminal 100 (e.g., a light stick terminal 100-2) for receiving and storing performance preparation data.

In the embodiment, the basic library may be a library implementing a relatively simple light emission pattern such as turning on/off or fade in/out of the lighting device 300.

Meanwhile, in the embodiment of the present invention, at least part of a plurality of lighting devices 300 may be a setting-type lighting device for which the initial setting has been completed. And at least part of the remaining lighting devices may be a basic-type lighting device for which the initial setting has not been completed.

The initial setting according to the embodiment may refer to a process of performing event registration for the lighting device 300 and/or storing performance preparation data therein.

The setting-type lighting device may be 1) a lighting device 300 for which event registration has been performed.

The event registration according to the embodiment may mean a functional operation for defining a control protocol for controlling the lighting device 300.

In other words, the setting-type lighting device may define a control protocol for the corresponding lighting device 300 in advance and control the light emission of the light source unit 360 according to a lighting device control signal conforming to the defined control protocol.

Also, the setting-type lighting device may be a 2) lighting device 300 in which performance preparation data is stored.

The setting-type lighting device may pair with the light stick terminal 100-2 matched to the corresponding setting-type lighting device after the event registration is completed.

Also, the setting-type lighting device may receive predetermined performance preparation data through the pairing and may store and manage the received data.

The setting-type lighting device may receive predetermined performance preparation data by performing Bluetooth pairing with a predetermined light stick terminal 100-2 and may store and manage the received performance preparation data in the storage unit 320.

Meanwhile, the basic-type lighting device in the embodiment may be a lighting device 300 which has not completed the event registration and/or not stored the performance preparation data.

On the other hand, each of the plurality of lighting devices 300 may implement a light emission operation in a manual operation mode in which the light source unit 360 is controlled according to a user's operation or may implement the light emission operation in a performance operation mode in which the light source unit 360 is controlled according to a lighting device control signal received from the outside (e.g., a lighting device control signal received from the central server 200 in a broadcasting manner).

In the embodiment, each of the plurality of lighting devices 300, while operating based on the manual operation mode, may automatically switch to the performance operation mode to control the light source unit 360 and perform the light emission operation when the lighting device control signal is detected.

Hereinafter, an integrated control method for a plurality of lighting devices 300 based on a basic library by the directing application 111 executed by at least one or more processors of a director terminal 100-1 will be described in detail with reference to appended drawings.

According to an embodiment of the present invention, at least one or more processors of the director terminal 100-1 may execute at least one or more directing applications 111 stored in at least one or more memories 110 or make the at least one or more directing applications 111 operate in the background mode.

The at least one or more processors performing a method for providing the integrated lighting control service by executing the commands of the directing application 111 will be described as a performance of the method by the directing application 111.

Figure 5:
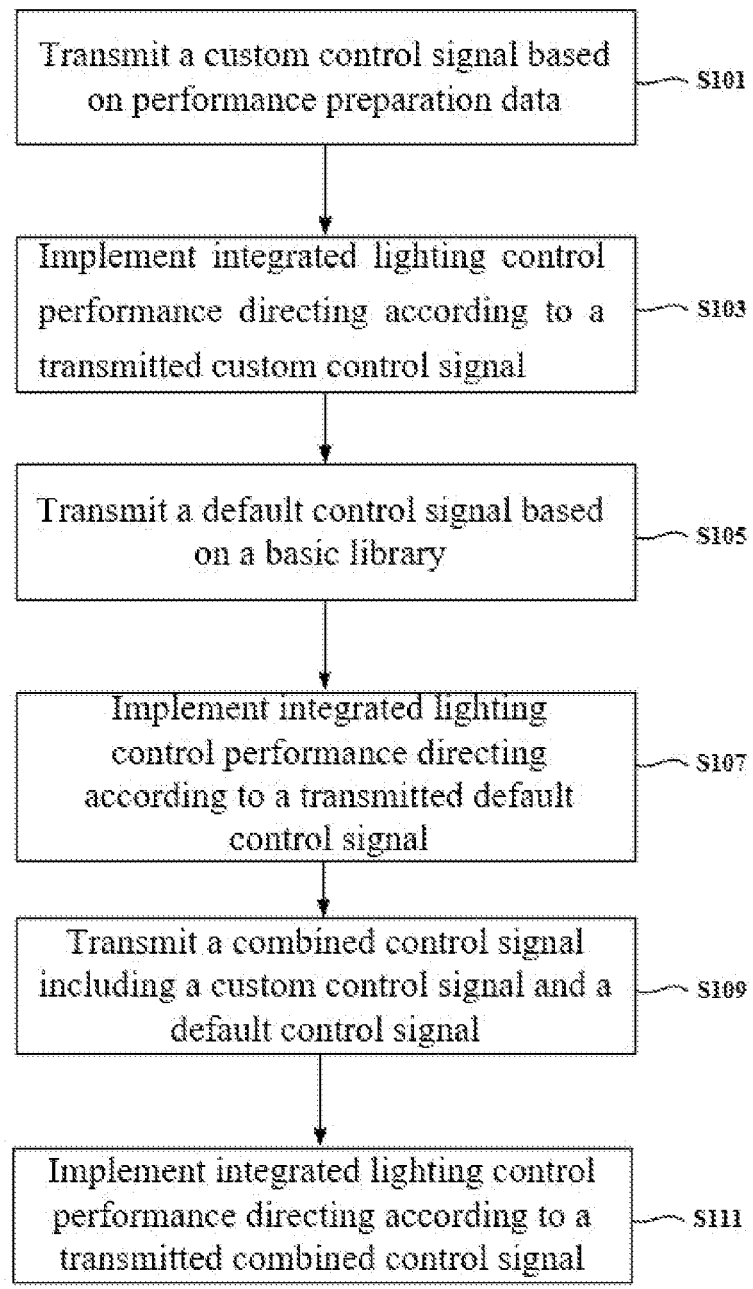
FIG. 5 is a flow diagram illustrating an integrated control method for a plurality of lighting devices based on a basic library according to an embodiment of the present invention.

FIG. 5 is a flow diagram illustrating an integrated control method for a plurality of lighting devices 300 based on a basic library according to an embodiment of the present invention.

Referring to FIG. 5, a directing application 111 executed on at least one or more processors of the director terminal 100-1 or operating in the background mode may transmit a custom control signal based on performance preparation data S101.

Here, the custom control signal according to the embodiment may mean a lighting device control signal instructing execution/suspension/termination of at least one library and/or scenario included in the performance preparation data stored in the lighting device 300.

In other words, the directing application 111 according to the embodiment may transmit the custom control signal to a plurality of lighting devices 300 to perform light emission control based on a library and/or a scenario within the performance preparation data stored in each of the plurality of lighting devices 300.

The directing application 111 may transmit the custom control signal to a plurality of lighting devices 300 in conjunction with the central server 200.

More specifically, the directing application 111 may transmit a transmission request for the custom control signal to the central server 200.

Then the central server 200 may transmit the custom control signal to the plurality of lighting devices 300 in conjunction with at least one or more repeaters R.

And the central server 200 may transmit the custom control signal to the plurality of lighting devices 300 based on a broadcasting method.

It should be noted that when a unicast method is employed rather than a broadcasting method, the central server 200 has to transmit a data packet to be transmitted (e.g., a lighting device control signal) to a plurality of receivers (e.g., a plurality of lighting devices 300) many times, which may lead to decrease of network efficiency due to redundant transmission of the same packet.

Also, when a unicast method is employed instead of a broadcasting method, the central server 200 has to receive the ack message in response to the reception of a transmitted data packet (e.g., a lighting device control signal) respectively from a plurality of receivers (e.g., lighting devices 300), which may prevent data communication from being performed smoothly due to deterioration of communication conditions.

Therefore, the central server 200 according to an embodiment of the present invention may transmit a predetermined lighting device control signal to the plurality of lighting devices 300 in conjunction with a repeater R using a broadcasting scheme based on one-to-many communication method in which a data packet (e.g., a lighting device control signal) is transmitted without separate designation of a recipient over the entire network to which the central server belongs.

Therefore, the central server 200 minimizes communication loss of a lighting device control signal transmitted and, at the same time, a communication synchronization error among a plurality of lighting devices 300, thereby improves the communication efficiency.

Returning to the description of the embodiment, the directing application 111 may transmit the custom control signal to the plurality of lighting devices 300 based on a broadcasting scheme in conjunction with the central server 200 (and/or repeater R).

If a lighting device 300 which has received the custom control signal is the setting-type lighting device, the setting-type lighting device may perform a light emission operation according to the received custom control signal.

On the other hand, if a lighting device 300 which has received the custom control signal is the basic-type lighting device, the basic-type lighting device may not perform a light emission operation according to the received custom control signal.

In other words, the directing application 111 may perform light emission control of a plurality of setting-type lighting devices which have completed the initial setting (namely, event registration and/or storage of performance preparation data) using the custom control signal.

Subsequently, the directing application 111 may implement integrated lighting control performance according to the transmitted custom control signal S103.

Figure 6:
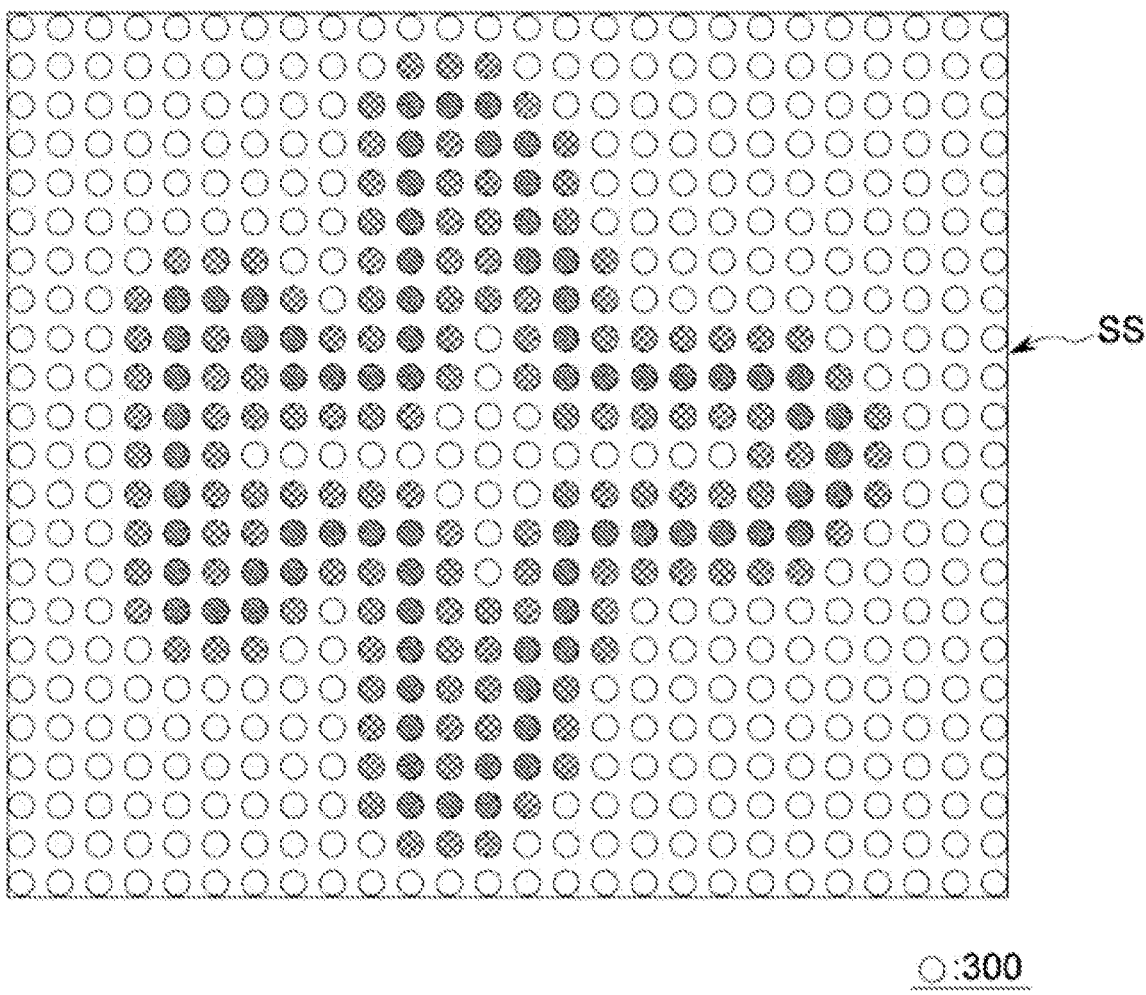
FIG. 6 is an example of a specific pattern planned for integrated lighting control performance according to an embodiment of the present invention.

FIG. 6 is an example of a specific pattern planned for integrated lighting control performance according to an embodiment of the present invention.

In other words, referring to FIG. 6, the directing application 111 according to the embodiment may implement integrated lighting control performance in which each of the plurality of setting-type lighting devices collectively operates based on the transmitted custom control signal with a light emission pattern specific to the lighting device to produce a specific shape SS as a whole.

At this time, in the embodiment, each of the plurality of setting-type lighting devices that have received the custom control signal may control the light emission operation of each light source unit 360 based on the received custom control signal.

The setting-type lighting device may detect a library and/or a scenario matching the received custom control signal based on the performance preparation data stored in the storage unit 320.

For example, the setting-type lighting device may read out a first library in the performance preparation data stored in the storage unit 320 when a received first custom control signal is a first library execution signal. As another example, the setting-type lighting device may read out a first scenario in the performance preparation data stored in the storage unit 320 when a received second custom control signal is a first scenario execution signal.

The setting-type lighting device may read out a library and/or a scenario according to the custom control signal based on predetermined identification information (e.g., library identification information and/or scenario identification information) included in the received custom control signal.

Also, the setting-type lighting device may control the light emission operation of the light source unit 360 according to a light emission pattern corresponding to the detected library and/or scenario.

The setting-type lighting device may control the light emission operation of the light source unit 360 according to the light emission pattern information of the detected library and may control the light emission operation of the light source unit 360 according to the light emission pattern information (hereinafter, scenario pattern information) of the detected scenario.

For example, the setting-type lighting device may control the light emission operation of the light source unit 360 based on setting values pertaining to whether to emit light, color, brightness, and/or a dynamic effect according to the first light emission pattern information (for example, "turn on/first color/first brightness/first dynamic effect") of the read-out first library.

As another example, the setting-type lighting device may control the light emission operation of the light source unit 360 based on setting values as to whether to emit light, color, brightness, and/or a dynamic effect according to first scenario pattern information (for example, "first light emission pattern information of the first library/second light emission pattern information of the second library/first built-in pattern information) of the first scenario read out.

In other words, the directing application 111 transmits a custom control signal to the plurality of setting-type lighting devices to make the plurality of setting-type lighting devices perform a collective light emission operation through the process described above, thereby implementing integrated lighting control performance directing based on the plurality of setting-type lighting devices may be achieved.

As described above, the directing application 111 may pre-store the performance preparation data including at least one library and/or scenario on each of a plurality of setting-type lighting devices, provide a custom control signal instructing execution/suspension/termination of at least one of the corresponding library and/or scenario to the plurality of setting-type lighting devices, interpret the provided custom control signal based on the performance preparation data pre-stored in each of the plurality of setting-type lighting devices, and operate each of the plurality of setting-type lighting devices to collectively emit light according to the light emission pattern of a predetermined library and/or scenario based on the corresponding custom control signal, thereby implementing various shapes of preset light emission patterns using a plurality of setting-type lighting devices according to the director's needs may be achieved.

Also, in the embodiment, the directing application 111 may transmit a default control signal based on a basic library S105.

The default control signal according to the embodiment may mean a lighting device control signal instructing execution/suspension/termination of a basic library stored in a lighting device 300.

In the embodiment, the default control signal may be implemented by including a universal event code that controls the basic library.

The directing application 111 may transmit the default control signal to the plurality of lighting devices 300 according to a broadcasting scheme in conjunction with the central server 200 (and/or a repeater R).

A method for transmitting the default control signal to the plurality of lighting devices 300 by the central server 200 can be implemented by the same or similar method for transmitting the custom control signal to the plurality of lighting devices 300 by the central server 200 in the S101 step above with the necessary changes that is required for the transmission of the default control signal to the plurality of lighting devices 300. Therefore, hereinafter, repeated descriptions may be shortened or omitted, and the differences from the descriptions already explained above will be mainly described.

A plurality of lighting devices 300 which have received the default signal may perform a light emission operation according to the received default control signal.

In other words, the plurality of lighting devices 300 according to the embodiment of the present invention may already store the at least one basic library in the firmware and thus may perform a basic light emission operation according to the default control signal without performing separate event registration or pairing.

In other words, the directing application 111 may perform light emission control using the default control signal on all lighting devices 300 regardless of whether the initial setting has been completed.

Subsequently, the directing application 111 may implement integrated lighting control performance according to the transmitted default control signal S107.

In other words, the directing application 111 may implement integrated lighting control performance that makes the plurality of lighting devices 300 operate collectively according to a predetermined light emission pattern based on the transmitted default control signal.

Each of the plurality of lighting devices 300 which have received the default control signal may control the light emission operation of each light source unit 360 based on the received default control signal.

The lighting device 300 may identify a basic library matching the received default control signal among at least one basic library stored in the storage unit 320.

For example, the lighting device 300 may read out the first library from among at least one basic library stored in the storage unit 320 when a received first default control signal is a first basic library execution signal.

For example, the lighting device 300 may read out a basic library according to the default control signal based on predetermined identification information (e.g., library identification information) indicated by the received default control signal.

Also, the lighting device 300 may control the light emission operation of the light source unit 360 according to a light emission pattern corresponding to the identified basic library.

For example, the lighting device 300 may control the light emission operation of the light source unit 360 based on a setting value with respect to a light emission pattern according to the first light emission pattern information (for example, "turn on light" or "turn off light") of the first basic library read out.

In other words, the directing application 111 enables the plurality of lighting devices 300 to perform a collective light emission operation through the process described above by transmitting a default control signal to the plurality of lighting devices 300, thereby implements integrated control performance using the plurality of lighting devices 300.

Since the directing application 111 may perform light emission control of the lighting device 300 using a basic library stored by default on the storage unit 320 of the lighting device 300 without involving separate event registration or pairing, even when the initial setting is not performed on the lighting device 300 due to various causes (for example, a user's being late for the performance, the user's not having downloaded the performance preparation data in advance to the lighting device 300, or occurrence of a problem in data transmission to the lighting device 300 due to a system failure, etc.), the directing application 111 may still perform light emission control using a basic library stored by default in the corresponding lighting devices 300 to support those lighting devices 300 (e.g., basic-type lighting devices) which have not completed the initial setting to participate in the planned performance directing effectively.

And the directing application 111 may operate a plurality of setting-type lighting devices and a plurality of basic-type lighting devices with different light emission patterns based on the default control signal.

When the plurality of setting-type lighting devices receive performance preparation data through pairing, the directing application 111 may change the light emission pattern information of one of the basic libraries (hereinafter, a basic library for setting confirmation) pre-stored in the firmware of the plurality of setting-type lighting devices to the emission pattern information of a specific library in the performance preparation data (hereinafter, a preparation library for setting confirmation).

Thereafter the directing application 111 may transmit a default control signal for executing the basic library for setting confirmation to all of the plurality of setting-type lighting devices and the plurality of basic-type lighting devices.

Thus, the directing application 111 may make the plurality of basic-type lighting devices receiving the default control signal operate according to a light emission pattern based on the basic library for setting confirmation and make the plurality of setting-type lighting devices receiving the default control signal operate according to a light emission pattern based on the preparation library for setting confirmation.

In other words, when the directing application 111 changes one (e.g., basic library for setting confirmation) of light emission pattern information among the basic libraries pre-stored in the plurality of setting-type lighting devices into one of light emission pattern information based on performance preparation data and transmits a default control signal that executes the basic library for setting confirmation to all of the plurality of basic-type lighting devices and the plurality of setting-type lighting devices, the plurality of basic-type lighting devices may perform a light emission operation according to the basic library for setting confirmation, and the plurality of setting-type lighting devices may perform a light emission operation according to the preparation library for setting confirmation.

In other words, the directing application 111 may transmit a default control signal that executes the basic library for setting confirmation to the plurality of basic-type lighting devices and the plurality of setting-type lighting devices to make the plurality of basic-type lighting devices and the plurality of setting-type lighting devices perform light emission operations according to different light emission patterns.

Through the steps above, the directing application 111 may execute a light emission operation for all of the lighting devices 300 without leaving any lighting device 300 not operate even when only the default control signal is transmitted, thereby not spoiling the appearance of directed performance and at the same time, more clearly distinguish and identify both types of lighting devices 300 through a light emission operation that expresses a remarkable visual contrast between lighting devices 300 storing performance preparation data (e.g., setting-type lighting devices) and those not storing the performance preparation data (e.g., basic-type lighting devices) may be achieved.

Also the directing application 111 may transmit a combined control signal including a custom control signal and a default control signal S109.

Here, the combined control signal according to the embodiment may mean a lighting device control signal capable of simultaneously performing execution/suspension/termination of preparation data stored in the lighting device 300 and an execution/suspension/termination instruction for a basic library.

In the embodiment, the combined control signal may include a first control signal instructing light emission control based on the performance preparation data stored in the lighting device 300 (i.e., a custom control signal in the embodiment) and a second control signal instructing light emission control based on a basic library stored in the library ((i.e., a default control signal in the embodiment).

The directing application 111 in the embodiment may transmit the combined control signal to the plurality of lighting devices 300 according to a broadcasting scheme in conjunction with a central server 200 (and/or a repeater R).

A method for transmitting the combined control signal to the plurality of lighting devices 300 by the central server 200 can be implemented by the same or similar method of transmitting the custom control signal to the plurality of lighting devices 300 by the central server 200 in the S101 step with the necessary changes that is required for the transmission of the combined control signal to the plurality of lighting devices 300. Therefore, hereinafter, repeated descriptions may be shortened or omitted, and the differences from the descriptions already explained above will be mainly described.

The directing application 111 may implement integrated lighting control performance according to the combined control signal transmitted S111.

In other words, the directing application 111 may implement integrated lighting control performance that makes the plurality of lighting devices 300 operate collectively according to a predetermined light emission pattern based on the combined control signal transmitted.

If the lighting device 300, which has received the combined control signal, is the setting-type lighting device, the directing application 111 in the embodiment may perform a light emission operation by using a first control signal (i.e., the custom control signal) in the combined control signal first.

In other words, the setting-type lighting device which has received the combined control signal may control the light emission operation of the light source unit 360 of the corresponding setting-type lighting device by applying the first control signal in the received combined control signal before the other control signals.

On the other hand, if the lighting device 300 which has received the combined control signal is the basic-type lighting device, the directing application 111 may perform a light emission operation by using a second control signal (i.e., the default control signal) in the combined control signal first.

In other words, the basic-type lighting device which has received the combined control signal may control the light emission operation of the light source unit 360 of the corresponding basic-type lighting device by applying the second control signal in the received combined control signal before the other control signals.

In this way, the directing application 111 may perform collective light emission control for both the setting-type lighting device which has completed the initial setting and the basic-type lighting device which has not completed the initial setting using a single lighting device control signal, so that a light emission operation for all lighting devices 300 may be controlled simultaneously with ease and convenience through a single lighting device control signal (i.e., a combined control signal) without having to transmit different lighting device control signals to each of the setting-type and basic-type lighting devices.

Integrated Control Method for a Plurality of Lighting Device Groups Based on Different Control Protocols In general, a lighting device 300 may be controlled based on different control protocols depending on main actors of the performance (e.g., a specific musician) or manufacturers of the lighting devices.

For example, the light emission operation of a first lighting device group used for the performance of a first musician and a second lighting device group used for the performance of a second musician may be controlled according to different control protocols.

However, as described above, the situation which requires a plurality of lighting devices complied with different control protocols to be controlled in harmony to implement a unified expression.

For example, when a first musician and a second musician give a joint performance, namely, when a first lighting device group and a second lighting device group coexist, the first lighting device group and the second lighting device group may have to perform in a unified fashion for the joint performance although the respective groups use different control protocols.

However, the plurality of lighting device groups above requires separate control consoles to perform control of each group of lighting device complied with different control protocol and cause a problem that as many control consoles as the number of different control protocols are needed.

Moreover, for this reason, external factors such as various cue signs and LTC for controlling the plurality of control consoles simultaneously are additionally required, which cause the increase of the required cost and efforts. In addition, the increased cost and efforts reduce the flexibility to add a lighting device group and the likelihood of the unified concert, etc.

Therefore, an embodiment of the present invention intends to disclose a method capable of implementing integrated lighting control performance by collectively and simultaneously controlling a plurality of lighting device groups controlled by the different control protocols.

Hereinafter, an integrated control method for a plurality of lighting device groups based on different control protocols by at least one or more processor modules 210 (hereinafter, a server processor) of a central server 200 will be described in detail with reference to drawings.

In the following description of the embodiment, for an effective description, it is assumed that the plurality of lighting device groups comprises a first lighting device group (hereinafter, a first lighting group) and a second lighting device group (hereinafter, a second lighting group). However, the present invention is not limited to the specific description below, and it should be clearly understood that an embodiment of the present invention may still be applied to the case where a more significant number of lighting device groups are involved.

Also, even though the description of the embodiments below may be distinguished separately from each other, it is only for the effective explanation. Various embodiments may be further implemented so that at least part of the embodiments may be combined systematically for their operation.

Also, the descriptions below overlapping with those described in the integrated control method for a plurality of lighting devices 300 based on the basic library may be summarized or omitted.

Figure 7:
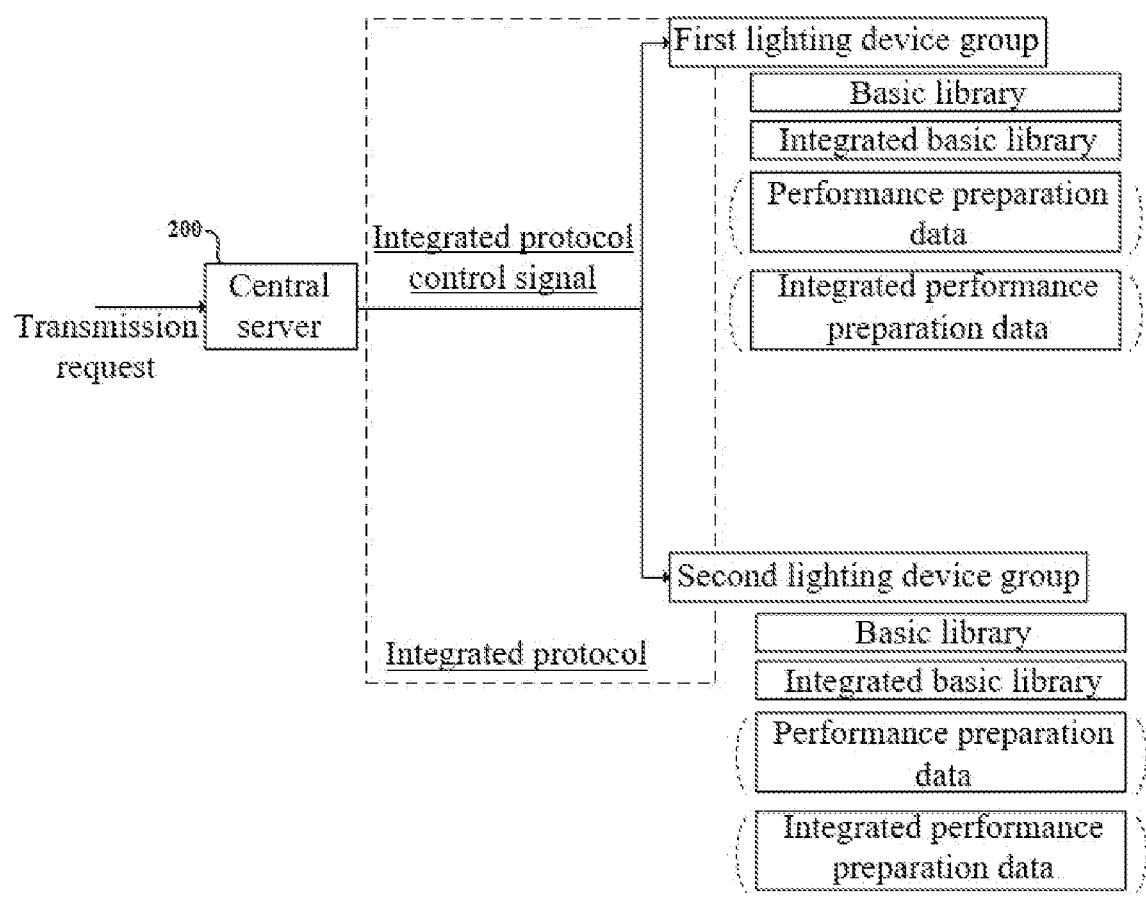
FIGS. 7 and 8 are conceptual drawings illustrating an integrated control method for a plurality of lighting device groups based on different control protocols according to an embodiment of the present invention.
Figure 8:
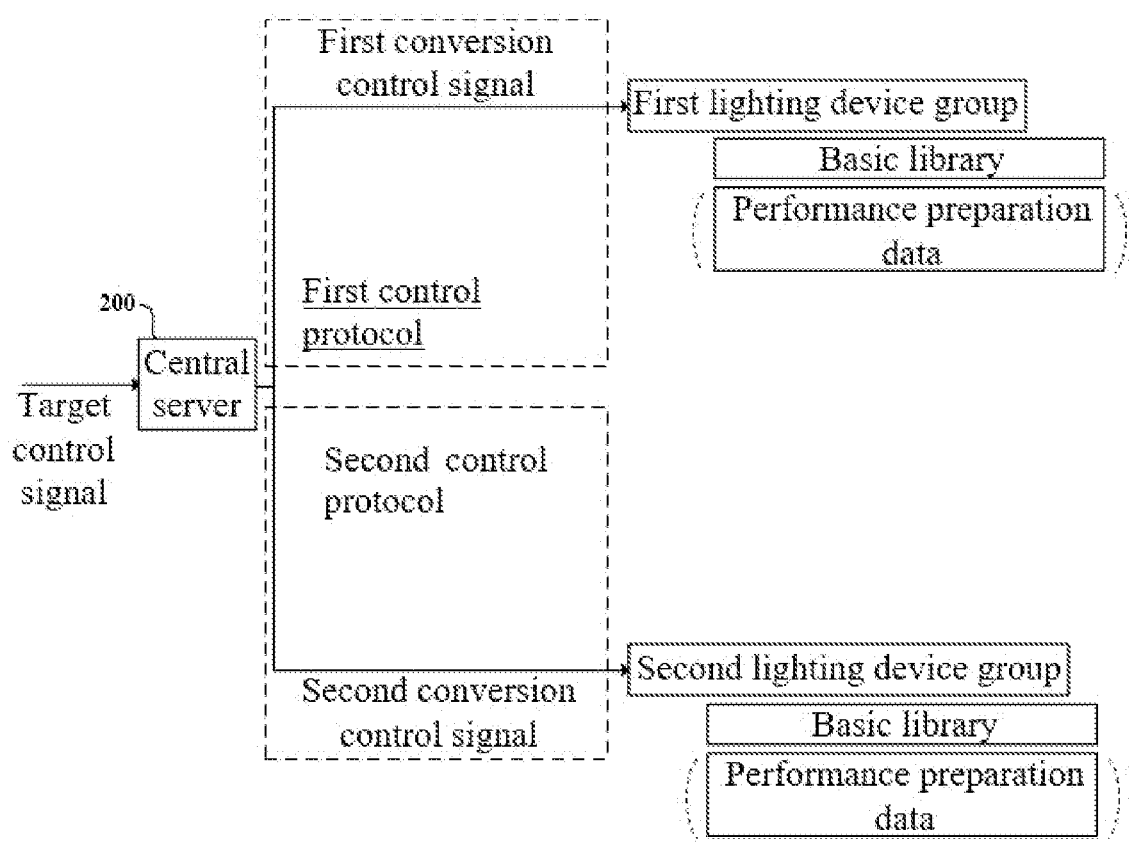

FIGS. 7 and 8 are conceptual drawings illustrating an integrated control method for a plurality of lighting device groups based on different control protocols according to an embodiment of the present invention.

Transmission of an Integrated Protocol Control Signal Based on Integrated Control Data Referring to FIG. 7, the integrated protocol control signal may refer to a lighting device control signal transmitted and received based on a third control protocol (hereinafter, an integrated protocol) providing a unified control protocol for a first lighting group and a second lighting group each of which is complied with different control protocols.

The integrated protocol control signal may include a custom integrated control signal and/or a default integrated control signal.

The custom integrated control signal may mean a lighting device control signal instructing execution/suspension/termination of at least one library and/or scenario included in the integrated performance preparation data stored in the lighting device 300.

In other words, the integrated performance preparation data may be performance preparation data including at least one library and/or scenario executed/suspended/terminated by the custom integrated control signal.

Each of a plurality of lighting devices 300 may pre-store and manage at least one integrated performance preparation data through the pairing described above.

On the other hand, the default integrated control signal mean a lighting device control signal instructing execution/suspension/termination of an integrated basic library stored in the lighting device 300.

In other words, the integrated basic library may be at least one basic library executed/suspended/terminated by the default integrated control signal.

Each of a plurality of lighting devices 300 may pre-store and manage at least one integrated basic library in the firmware described above.

Also, the integrated control data may mean the data including the integrated performance preparation data and/or integrated basic library.

Returning to the description, the server processor 210, based on a broadcasting scheme, may transmit the integrated protocol control signal to a plurality of lighting devices 300 which are belongs to the first lighting group or the second lighting group.

When the plurality of lighting devices 300 is a setting-type lighting device storing the integrated performance preparation data, the server processor 210 may transmit the integrated control signal based on the custom integrated control signal.

Then, the plurality of setting-type lighting devices receiving the custom integrated control signal may control the light emission operation of each light source unit 360 based on the received custom integrated control signal. The description of the S103 step applies to the description of the light emission operation of the plurality of setting-type lighting devices receiving the custom integrated control signal.

In other words, even if the plurality of setting-type lighting devices follows different control protocols, the server processor 210 may make the plurality of setting-type lighting devices perform a light emission operation collectively through the process above using the integrated protocol by transmitting a custom integrated control signal to the plurality of setting-type lighting devices.

Through the operation above, the server processor 210 may easily implement integrated lighting control performance using a plurality of setting-type lighting devices complying with the different control protocols by the user of one control console (e.g., the central server 200).

Meanwhile, the server processor 210 may transmit the integrated protocol control signal to the plurality of lighting devices 300 based on the default integrated control signal.

In other words, the plurality of lighting devices 300 according to the embodiment of the present invention may already store the at least one integrated basic library in the firmware and thus may perform a light emission operation according to the default integrated control signal without performing separate event registration or pairing.

Accordingly, a plurality of lighting devices 300 which have received the default integrated control signal may control the light emission operation of each light source unit 360 based on the received default integrated control signal.

In other words, even if the plurality of lighting devices 300 support different control protocols, the server processor 210 may make the plurality of lighting devices perform a light emission operation collectively through the process above using the integrated protocol by transmitting a custom integrated control signal to the plurality of lighting devices 300. And integrated lighting control performance using a plurality of lighting devices 300 supporting different control protocols may be implemented efficiently using only one control console (e.g., the central server 200).

Also, as described above, the server processor 210 collectively controls a plurality of lighting groups conforming to different control protocols with only one integrated protocol control signal, thereby it makes considerable reduction of the cost or efforts required to control the plurality of lighting groups collectively and further enables a new lighting device group based on another control protocol to be added easily and flexibly to implement the integrated lighting control performance with the new lighting device group.

Transmission of Conversion Control Signal Based on Each Control Protocol

Referring to FIG. 8, the conversion control signal according to the embodiment may mean a lighting device control signal detected as a control signal corresponding to a lighting device control signal to be transmitted (e.g., a custom control signal, a default control signal, and/or a combined control signal) to the plurality of lighting devices 300 based on a control protocol for each lighting group.

In other words, the conversion control signal may be a lighting device control signal obtained by detecting, based on the control protocol for each lighting group, a control signal corresponding to a lighting device control signal (hereinafter, a target control signal) to be transmitted to a plurality of lighting devices 300 belonging to the first lighting group and the second lighting group.

The directing application 111 according to the embodiment may request the central server 200 to transmit the target control signal to the plurality of lighting devices 300.

Then, the server processor 210 of the central server 200 receiving the request for transmission of the target control signal may detect a control signal (i.e., a conversion control signal) corresponding to the received target control signal from each of a plurality of control protocols corresponding to the plurality of lighting devices 300.

In other words, the server processor 210 may detect a first conversion control signal for the target control signal from a first control protocol of the first lighting group and detect a second conversion control signal for the target control signal from a second control protocol of the second lighting group.

Also, the server processor 210 may transmit the conversion control signal detected for each lighting group to a plurality of lighting devices 300 of the lighting group using the control protocol for the corresponding lighting group.

In other words, the server processor 210 may convert the target control signal into the corresponding control signal for each lighting group and transmit the converted control signal to each of the corresponding lighting devices 300 using the control protocol for each lighting group.

The server processor 210 may transmit a first conversion control signal detected from the first control protocol of the first lighting group for the target control signal to the first lighting group through the first control protocol and transmit a second conversion control signal detected from the second control protocol of the second lighting group for the target control signal to the second lighting group through the second control protocol.

The server processor 210 may transmit the conversion control signal to the plurality of lighting devices 300 based on a broadcasting scheme.

As described above, the server processor 210 may automatically convert a target control signal to be transmitted to the plurality of lighting devices 300 into an optimal form based on each control protocol corresponding to the plurality of lighting devices 300 and, by using the optimal form, may transmit a lighting device control signal instructing a light emission operation for the plurality of lighting devices 300 through each control protocol. Thus, it is possible to transmit the target control signal to the plurality of lighting devices 300 using one control console (e.g., the central server 200) even when a plurality of lighting groups controlled by different control protocols coexist.

Through the operation above, the server processor 210 may more easily implement a unified performance directing using the plurality of lighting devices 300 complying with different control protocols and, at the same time, improve the accuracy of collective and simultaneous control of the plurality of lighting devices 300, thereby it causes the improvement of the level of completeness.

As described above, a plurality of lighting devices 300 and an integrated control method and system thereof according to an embodiment of the present invention support collective control of all lighting devices 300 regardless of the operating environment for each of the plurality of lighting devices 300, thereby easily implementing simultaneous control of all the related lighting devices 300 without performing separate processing for each lighting device 300 having a different operating environment and without exerting additional efforts to unify the lighting devices 300 may be achieved.

Also, even when the operating environment is poorly established and various types of data required for remote control are not stored in advance on at least part of lighting devices 300 due to some factors (e.g., lack of preparation by the user and/or a system failure, etc.), a plurality of lighting devices 300 and an integrated control method and system thereof according to an embodiment of the present invention support remote control of lighting devices 300 which have not completed initial settings required for getting the lighting devices controlled remotely by using a universal event code, thereby performing unified remote control of all of the lighting devices 300 including the corresponding lighting devices 300 and enabling all of the lighting devices 300 to participate in planned performance directing smoothly may be achieved.

Also, a plurality of lighting devices 300 and an integrated control method and system thereof according to an embodiment of the present invention support collective, simultaneous control of a plurality of lighting device groups controlled by different control protocols, thereby it makes easy and accurate implementation of a unified performance directing based on light emission operations of the plurality of lighting device groups using only one control console even when a plurality of lighting device groups conforming to different control protocols coexist, considerable reduction of the cost or efforts required to control the plurality of lighting groups collectively and further enables a new lighting device group based on another control protocol to be added easily and flexibly to implement the integrated lighting control performance with new lighting device group.

Meanwhile, the embodiments of the present invention may be implemented in the form of program commands which may be executed through various types of computer and may be recorded in a computer-readable recording medium. The computer-readable recording medium may include program commands, data files, and data structures separately or in combination thereof. The program commands recorded in the computer-readable recording medium may be those designed and configured specifically for the present invention or may be those commonly available for those skilled in the field of computer software. Examples of a computer-readable recoding medium may include magnetic media such as hard-disks, floppy disks, magnetic tapes, optical media such as CD-ROMs and DVDs, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the operations of the present disclosure, and vice versa.

Specific implementation of the present invention are embodiments, which does not limit the technical scope of the present invention in any way. For the clarity of the disclosure, descriptions of conventional electronic structures, control systems, software, and other functional aspects of the systems may be omitted. Also, connection of lines between elements/components shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to elements/components needed for application of the present invention.

Also, although detailed descriptions of the present invention have been given with reference to preferred embodiments of the present invention, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present invention is not limited to the specifications provided in the detailed descriptions of this document but has to be defined by the appended claims.

What is claimed is:

1. A method for integrated control of a plurality of lighting devices by a directing application, the method comprising:
    transmitting a combined control signal to a plurality of lighting devices, wherein the combined control signal comprises a default control signal and a custom control signal; and
    implementing an integrated lighting control performance according to the transmitted combined control signal,
    wherein the default control signal is to instruct execution, suspension, or termination of a light emission pattern based on a basic library stored in at least one lighting device among the plurality of lighting devices,
    wherein the basic library is a default library stored in firmware of the at least one lighting device among the plurality of lighting devices by default and operates based on the default control signal, and
    wherein the integrated lighting control performance is to make each of the plurality of lighting devices operate collectively in a predetermined light emission pattern to produce a specific light emission pattern as a whole.

2. The method of claim 1, further comprising:
    performing an initial setting for at least part of the plurality of lighting devices.

3. The method of claim 2, wherein the initial setting comprises an event registration process that defines a control protocol for controlling the lighting device and a pairing process that stores performance preparation data into the lighting device.

4. The method of claim 3, wherein the performance preparation data comprises at least one of a library for setting a specific emission pattern for the lighting device and a scenario for setting a specific emission pattern for the lighting device for a predetermined period.

5. The method of claim 4, further comprising:
    transmitting the combined control signal with the custom control signal to a setting-type lighting device among the plurality of lighting devices and
    implementing an integrated lighting control performance according to the transmitted custom control signal,
    wherein the custom control signal is to instruct execution, suspension, or termination of a light emission pattern based on the performance preparation data stored in the setting-type lighting device, and
    wherein the setting-type lighting device is the part of the plurality of lighting devices that has completed the initial setting.

6. The method of claim 1, wherein the integrated lighting control performance according to the combined control signal comprises:
    determining whether the setting-type lighting device receives the combined control signal; and
    applying the custom control signal included in the combined control signal to the setting-type lighting device first if the setting-type lighting device receives the combined control signal.

7. A lighting device comprising:
    at least one storage unit for storing a basic library, wherein the basic library is a default library stored in firmware of the lighting device by default and operates based on a default control signal;
    at least one communication unit;
    at least one light source unit; and
    at least one processor, wherein the processor is configured to:
        receive performance preparation data through the communication unit;
        store the received performance preparation data in the storage unit;

receive a combined control signal through the communication unit, wherein the combined control signal comprises the default control signal and a custom control signal;
read out at least one of a library or a scenario corresponding to the received combined control signal from the basic library or the performance preparation data stored in the storage unit, wherein a scenario is preset data to operate the lighting device in a specific emission pattern for a predetermined period; and
execute a light emission operation according to at least one of the read-out library and scenario by controlling the light source unit.

* * * * *